United States Patent
Chen (10) Patent No.: US 6,169,389 B1
(45) Date of Patent: Jan. 2, 2001

(54) PUMPED CAPACITIVE STORAGE SYSTEM

(75) Inventor: William I. H. Chen, Bedford, TX (US)

(73) Assignee: Marconi Communications, Inc., Cleveland, OH (US)

(*) Notice: Under 35 U.S.C. 154(b), the term of this patent shall be extended for 0 days.

(21) Appl. No.: 09/286,055

(22) Filed: Apr. 5, 1999

(51) Int. Cl.$^7$ ............................................. H02J 7/00
(52) U.S. Cl. ................................. 320/166; 320/167
(58) Field of Search ................................. 320/166, 167, 320/141, 140; 363/59, 60, 71

(56) References Cited

U.S. PATENT DOCUMENTS

| | | | |
|---|---|---|---|
| 3,911,348 | * 10/1975 | Takemura et al. | 320/166 |
| 5,563,779 | * 10/1996 | Cave et al. | 320/166 |
| 5,714,863 | * 2/1998 | Hwang et al. | 320/166 |

* cited by examiner

*Primary Examiner*—Peter S. Wong
*Assistant Examiner*—Lawrence Luk (74) *Attorney, Agent, or Firm*—Jones, Day, Reavis & Pogue (57) ABSTRACT

An energy storage system is provided that includes input terminals for receiving input energy from a remote power source and an energy storage device coupled to the input terminals. The energy storage device is operative to store at least of portion of the input energy and to supply stored energy to the input terminals. A pump device is also coupled to the input terminal and to the storage device. The pump device is operative to cause the energy storage device to store at least a portion of the input energy when the input energy level is above a first threshold level, and to cause the energy storage device to supply energy to the input terminals when the input energy level is below a second threshold level. The energy storage system is optionally provided with a current limiter for added protection against short circuits. In one embodiment, the current limiter is bi-direction; it protects against short circuits originating at both the power source and within the energy storage system. Also, the energy storage system is optionally provided with a safety discharge circuit that discharges the energy storage system upon its removal from the energy storage system.

25 Claims, 3 Drawing Sheets

PUMPED CAPACITIVE STORAGE SYSTEM

BACKGROUND OF THE INVENTION

The present invention is directed toward the field of energy storage systems. In particular, the invention is directed to energy storage systems for use with remotely powered electronic or telecommunication devices.

Remotely powered devices are devices that are provided power from a power source located some distance away through the use of power transmission wires. When the remotely powered device's load demands are low or average, the power transmission wires are capable of delivering sufficient current and voltage. But, during peak load demand periods, the power transmission wires may not be capable of delivering sufficient power because of, among other things, power losses in the transmission wires and the power source's power supplying limits. To counteract these limitations, remotely powered devices are often provided with energy storage systems that store energy during low and average load demand periods and supply energy to the remotely powered devices during peak load periods.

A specific type of remotely powered electronic device is known as an optical network unit ("ONU"). An ONU is a device that is used as an interface between fiber optic telecommunication lines and traditional wires used to provide telecommunication services such as cable television and telephonic services to homes or other buildings. The ONU has a power supply that typically includes: (i) input protection and filter circuitry; (ii) energy storage circuitry, (iii) input voltage monitors and threshold circuitry, (iv) D.C. to D.C. power converters; (v) ringing generators; and (vi) alarm and digital interface circuitry.

Power is supplied to the ONU from a central location through thin telephone wires. As a result, the available peak power is extremely limited. At an ONU, the load current demand varies depending on the customers' telecommunication service usage. Peak loads occur, for example, when phone sets ring or when a coin-phone executes a coin-collection operation. The peak power requirement is substantially higher than the average requirement and typically exceeds the available power supplied over the power transmission wires. Thus, some form of local energy storage is needed that can supply energy to the ONU during peak load periods.

A few storage methods have been proposed to help meet the peak power requirement. In the past, batteries have been used for energy storage. Batteries, however, have limited service life and require periodic maintenance. They are not well accepted for use with modem remote telephone equipment.

Other methods include the use of a very large storage capacitor C to provide the energy storage, such as a 200V, 8000µF capacitor. When this method is used with an ONU, a capacitor is coupled across the input terminals of the ONU and is charged up, when the load conditions are low or average, to the input line voltage of typically 90V to 140V. During a peak load event, the input powering line will supply some of the power while the storage capacitor supplies a substantial portion of the load power by discharging its stored energy.

This method, however, is very inefficient. For example, the capacitor will only discharge enough energy to decrease the capacitor voltage from typically 90V, (V1), the voltage level at which the capacitor is initially charged, to typically 70V, (V2). In this example, the available energy is equal to $\frac{1}{2}*C[(V1)^2-(V2)^2]=12.8$ Joules. The energy stored in the capacitor before the discharge, however, was $\frac{1}{2}*C(V1)^2=32.4$ Joules. Thus, only 40% of the stored energy in the capacitor was made available to supply peak loads. As a result, larger and more costly capacitors must be used to meet peak load demands.

Therefore, there remains a need in this art for a more efficient energy storage system that can make more efficient use of the stored energy to meet peak load power demands. There remains a more particular need for an efficient energy storage system that can utilize smaller storage elements resulting in a substantial reduction in cost and size.

SUMMARY OF THE INVENTION

The present invention overcomes the problems noted above and satisfies the needs in this field for an efficient energy storage system. The pumped storage system of the present invention interposes a bi-directional pump, or alternatively known as a switching power converter, between the input powering terminals of the remotely powered device and a storage device. Whenever the available input power exceeds the load power demands, the bi-directional pump will pump energy into the storage device, charging it close to its voltage limit, which is higher than the level the storage device would be charged to under presently known methods. When the available input power is less than the load power demand, the bi-directional pump will reverse direction and pump energy from the storage device into the input terminal, supplying power to the load. The bi-directional pump is capable of supercharging the storage device, i.e., storing more energy into the storage device than presently known methods, making this form of storage much more space efficient.

The present invention provides additional features not found in the presently known energy storage systems. Not all of these features are simultaneously required to practice the invention as claimed, and the following list is merely illustrative of the types of benefits that may be provided, alone or in combination, by the present invention. These advantages include: (1) a bi-directional current limiter for added protection against short circuits; (2) more efficient use of the storage elements resulting in cost savings, physical space savings and the capability of using fewer, smaller, and less costly capacitors; and (3) a safety discharge circuit for added safety in handling the storage elements.

In accordance with the present invention, an energy storage system is provided that includes input terminals for receiving input energy from a remote power source and an energy storage device coupled to the input terminals. The energy storage device is operative to store at least a portion of the input energy and to supply stored energy to the input terminals. A pump device is also coupled to the input terminal and to the storage device. The pump device is operative to cause the energy storage device to store at least a portion of the input energy when the available input power exceeds the load power demands, and to cause the energy storage device to supply energy to the input terminals when the available input power is less than the load power demand.

In one embodiment the pump device uses power threshold levels to determine whether the available input power exceeds the load power demands. The power threshold levels are voltage threshold levels in one embodiment. In another embodiment, the power threshold levels are current threshold levels.

In yet another embodiment, the pump device is operative to cause the energy storage device to store at least a portion of the input energy when the available input power exceeds a first power threshold level, and to cause the energy storage device to supply energy to the input terminals when the available input power is less than a second power threshold level. In this embodiment, the power threshold levels may not correspond to whether the available input power exceeds the load power demands.

The energy storage system is optionally provided with a current limiter for added protection against short circuits. In one embodiment, the current limiter is bi-direction; it protects against short circuits originating at both the power source and within the energy storage system. Also, the energy storage system is optionally provided with a safety discharge circuit that discharges the energy storage system upon its removal from the remotely powered device.

BRIEF DESCRIPTION OF THE DRAWINGS

The present invention will become more apparent from the following description when read in conjunction with the accompanying drawings wherein.

DETAILED DESCRIPTION OF THE PREFERRED EMBODIMENT

Figure 1:
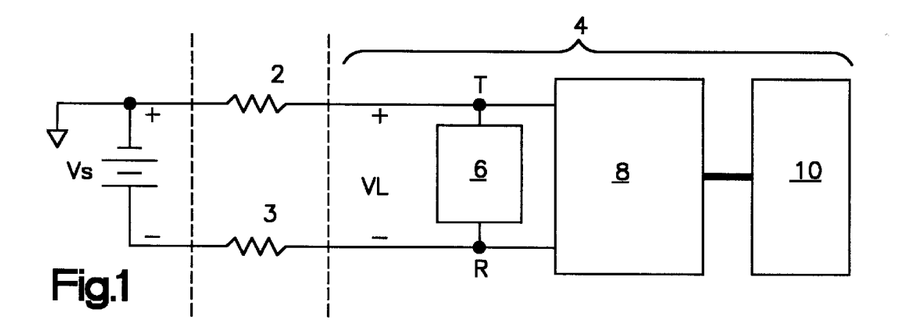
FIG. 1 is a block diagram of a remotely powered system.

Referring now to the drawings, FIG. 1 sets forth a block diagram of a remotely powered system. The power source Vs provides power on power transmission lines 2, 3 to a remotely powered device 4. In the illustrated embodiment, the power source Vs is a DC power source, but the system could be employed with an AC power source rectified to D.C. Due to resistance within the power transmission lines 2, 3, the line voltage VL at the input T, R to the remotely powered device 4 is somewhat less than the voltage supplied by the power source Vs. The line voltage VL at the input T, R of remotely powered device 4 is supplied to local energy storage device 6 so that energy can be stored therein during low load periods for use by remotely powered device 4 during peak load periods or during periods when the power transmission lines are not supplying sufficient power to meet the power needs of remotely powered device 4. The line voltage VL at the input T, R is also supplied to switching converters 8 which convert the line voltage VL to voltage levels usuable by the power loads 10 within remotely powered device 4.

Figure 2:
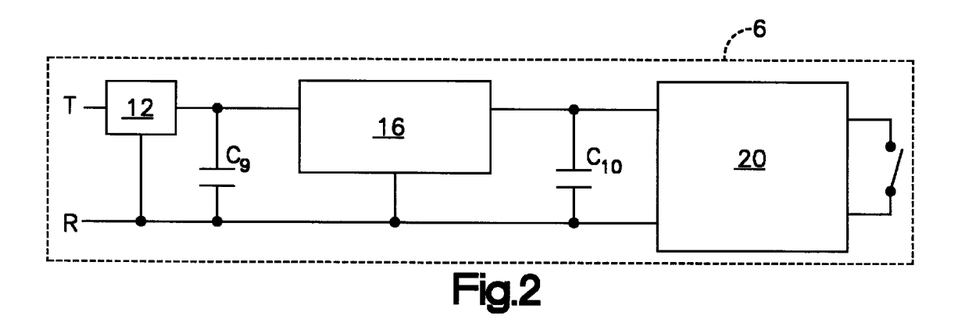
FIG. 2 is a block diagram of a preferred embodiment of a pumped capacitive storage system according to the present invention.

Now referring to FIG. 2, the local energy storage device 6 used in the remotely powered device 4 of the present invention is the pumped local energy storage device 6. In the illustrated embodiment, the pumped local energy storage device 6 includes an input capacitor C9, a storage capacitor C10, and a bi-directional switching converter 16 which is also designated as the pump 16.

The basic operation of the preferred pumped local energy storage device 6 is as follows. In the illustrated embodiment, the input line voltage VL can range from 140V down to 70V. The input capacitor C9 serves as transient bypass for all internal circuits of remotely powered device 4. Whenever the input line voltage VL is above a first threshold, 80V in the preferred embodiment, bi-directional switching converter 16 will use any available current at input T, R to charge the storage capacitor C10 up to the maximum storage level, 190V for the 200V capacitor used in the preferred embodiment. During the charging process, the input voltage VL is kept at the first threshold, 80V in the preferred embodiment, and all available current is used to charge storage capacitor C10. After storage capacitor C10 is fully charged to the maximum storage level, 190V in the preferred embodiment, the input voltage VL will then rise to a level determined by the steady load conditions. This pumping and supercharging of the storage capacitor C10 leads to increased efficiency and the capability of using a smaller capacitor. By supercharging, a greater percentage of the storage capacity of storage capacitor C10 is utilized.

The input capacitor C9 in the preferred embodiment is physically located within pumped storage device 6, but could physically reside at another location within the remote device 4 without departing from the present invention. Alternatively, one of skill in the art could use existing capacitance in the remote device 4 in lieu of adding an additional input capacitor.

During occasional heavy load conditions, the load current required by remotely powered device 4 may exceed the available current from the input line at T, R. As a result, input capacitor C9 will discharge and the input voltage VL will gradually decrease. When the input line voltage VL reaches the first threshold level, 80V in the illustrated embodiment, the bi-directional switching converter 16 will reverse direction and discharge the energy in storage capacitor C10 into the input capacitor C9. Storage capacitor C10 is sized to provide adequate energy storage for the intended surge loads. In the illustrated embodiment, both the input capacitor C9 and the storage capacitor C10 are 1000 $\mu$F, 200V capacitors. The preferred embodiment has been arranged such that the pump is triggered by the input voltage level. One skilled in the art, however, could also implement the present invention by triggering the pump based, alternatively, on other energy levels such as current levels without departing from the spirit of the invention.

The use of the pump 16 of the present invention makes more efficient use of the storage capacity, and allows a typically 9:1 reduction for the size of the storage capacitor. This affords a substantial reduction in cost and more importantly physical size. The idle power and conversion efficiency of the pump can be designed to consume a fraction of a Watt and represent a minuscule burden on the system.

The preferred pumped local energy storage device 6 is also provided with a bi-directional current limiter circuit 12 and a safety discharge circuit 20. The bi-directional current limiting circuit 12 may be inserted in series between either input T or R and the bi-directional switching converter 16 to limit the charge/discharge currents that could occur during an unintentional short to GND or high-voltage source Vs. The safety discharge circuit 20 discharges the high-voltage storage capacitor C10 to a lower safe voltage level, 4V in the preferred embodiment, when the pumped local energy storage device 6 is physically removed from active duty.

Figure 3A:
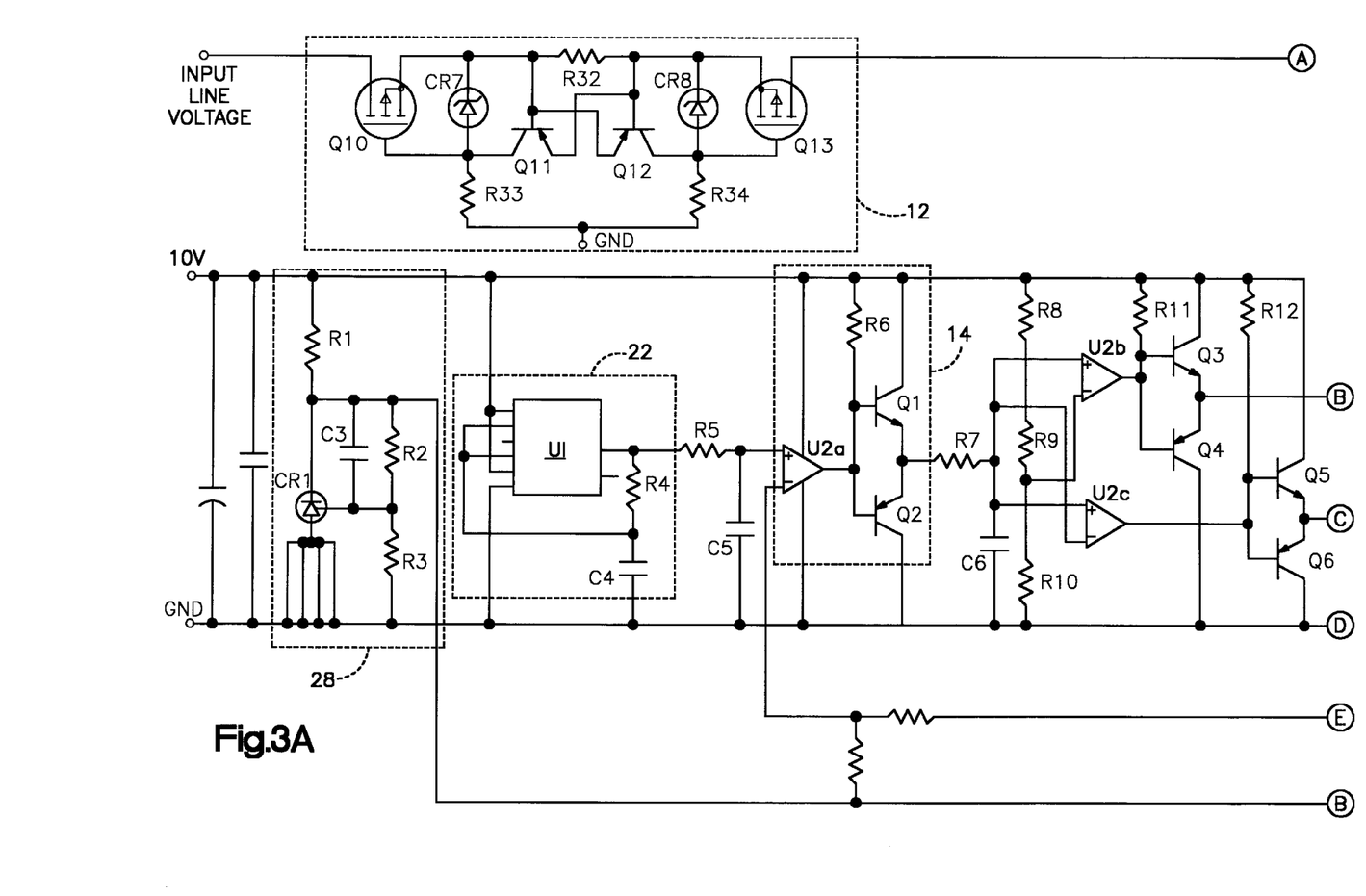
FIG. 3A is a schematic diagram of a preferred embodiment of a pumped capacitive storage system according to the present invention.
Figure 3B:
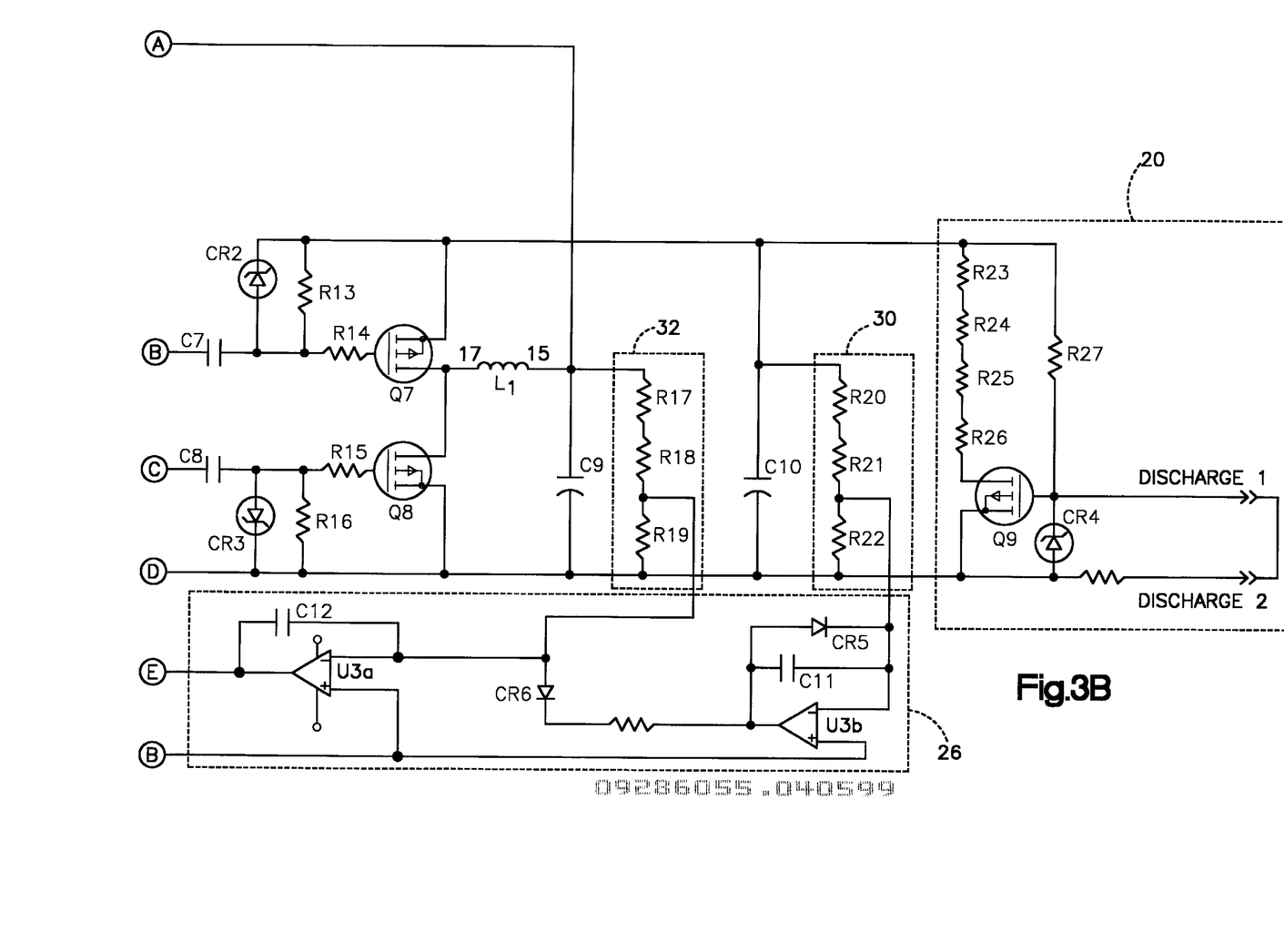
FIG. 3B is a continuation of FIG. 3A.

Referring now to FIGS. 3A and 3B, a functional description of the preferred circuit implementation follows. The description that follows is directed to an implementation of a preferred bi-directional switching converter or pump 16 that uses boost and buck converter configurations. One skilled in the art could, without departing from the spirit of the invention, implement the present invention using a different pump configuration such as a pump configuration using, for example, a bi-directional flyback converter configuration, a cuk converter configuration, a SEPIC converter, or a number of other switching converter configurations. The present invention could also be implemented using a bi-directional flyback converter configuration and a super capacitor as the pump and storage device, respectively.

The main components of the illustrated bi-directional switching converter or pump 16 include switches Q7 and Q8 and inductor L1, inductor L1 having an input end 15 and a switching end 17. The input line voltage VL is coupled to the input end 15 of inductor L1 and switches Q7 and Q8 are coupled to the switching end 17 of inductor L1. Switches Q7 and Q8 are driven by a pulse width modulator 14 and alternately connect the switching end 17 of inductor L1 between GND and storage capacitor C10. The illustrated bi-directional switching converter or pump 16 is recognized as a standard boost or buck converter. In the direction of the capacitor C9 to the capacitor C10, it is a boost converter. In the direction of the capacitor C10 to the capacitor C9, it is a buck converter.

Because switches Q7 and Q8 are actively driven switches, bi-directional switching converter or pump 16 operates in the continuous current mode at all times. In fact, the ratio of voltages on input capacitor C9 and storage capacitor C10 (V9 and V10 respectively) are determined by the switching, duty cycle signal D where:

$$V9 = D*V10, \text{ or equivalently } V10 = V9/D,$$

where duty cycle signal D is the fraction of the switching cycle that switch Q7 is on and switch Q8 is off.
Thus by controlling duty cycle signal D, the voltage ratio can be changed and the direction of the pump determined.

The preferred bi-directional switching converter 16 includes a control circuit 26 that controls the generation of signal D and the switching of switches Q7 and Q8. The control circuit 26 functions as follows. When voltage V9 is below 80V, signal D is set at a maximum duty-cycle, close to unity. Switch Q7 is ON almost constantly. Storage capacitor C10 is effectively connected to input capacitor C9. When voltage V9 approaches and reaches 80V from below, signal D is slowly decreased. This causes the pump 16 to increase voltage V10 by pumping current into storage capacitor C10, thus charging the storage capacitor C10. During the pump-up, all available input current is used to charge the storage capacitor C10 and the input V9 stays at 80V.

When voltage V10 reach a predetermined level, 190V in the illustrated embodiment, a detector 30 stops any further decrease of signal D and thus stops the charging process. At this point, the available current will flow into input capacitor C9 and voltage V9 will increase until it reaches a voltage level determined by system load conditions. During the time that input capacitor C9 is charging, signal D will adjust itself to accommodate the voltage-ratio equation above.

During overload condition, load current demand exceeds available line current and input capacitor C9 will first discharge to supply the load. Voltage V9 will decrease in the process. When voltage V9 decreases to 80V, the pump control circuit 26 will increase the duty cycle D, thus pumping energy from storage capacitor C10 into input capacitor C9, discharging storage capacitor C10 in the process. The discharging of storage capacitor C10 will continue until the overload condition stops. The available line current will then exceed the load current, and voltage V9 will increase and approach 80V from below. The pump 16 will then operate in the charging mode as described above.

The preferred bi-directional switching converter 16 is also provided with the following support circuits. An oscillator 22 is provided to set the switching frequency. The pulse-width-modulator 14 is provided to generate the duty-cycle D signal. A dead-time control circuit 24 is provided to generate gapped gate-drive signals for switches Q7 and Q8. The gap is necessary to insure that switches Q7 and Q8 are never on at the same instance. Also, the preferred bi-directional switching converter 16 is provided with an accurate 5V reference 28 for V9 and V10 sensing and threshold detection circuits, which will be described in more detail below.

The basic elements of the preferred pumped local energy storage device 6, bi-directional switching converter 16, input capacitor C9, storage capacitor C10, bi-directional current limiter circuit 12, safety discharge circuit 20, control circuit 26, oscillator 22, pulse-width-modulator 14, dead-time control circuit 24, and 5V reference 28, have been generally described. The preferred energy storage device 6 also has inputs for the input line voltage VL, Ground, and a 10V supply to power the internal circuits. A more detailed description of the specific implementation of the preferred embodiment follows.

The preferred current limiter 12 consists of four transistors Q10–Q13, three resistors R32–R34 and two diodes CR7–CR8. Transistors Q10 and Q13 are pass devices and preferably implemented with FETs. They are normally biased in the full conduction state. Normally, resistor R33 and diode CR7 keep the gate-to-source voltage of transistor Q10 at 10V. Similarly, resistor R34 and diode CR8 keep the gate-to-source voltage of transistor Q13 at 10V. Resistor R32 senses the current flowing through the pass devices Q10 and Q13.

The preferred current limiter 12 functions as follows. When the voltage across resistor R32 exceeds a diode drop, either transistor Q11 or Q12 will start conducting depending on the direction of the current flow. When transistor Q11 starts conducting, it will put the transistor Q10 in a regulating state. The transistors Q10 and Q11 and resistor R32 will form a constant current regulator in one direction. When transistor Q12 starts conducting, it will put the transistor Q13 in a regulating state. The transistors Q12 and Q13 and resistor R32 will form a constant current regulator in the other direction. The resistance of resistor R34 determines the magnitude of the current limit.

The preferred current limiter 12 uses the following components:

| | |
|---|---|
| Q10 | 1RF9620 |
| Q11 | 2N5807 |
| Q12 | 2N5807 |
| Q13 | IRF9620 |
| R32 | 1Ω, 1W |
| R33 | 1M, .1W |
| R34 | 1M, .1W |
| CR7 | 1N5240 |
| CR8 | 1N5240 |

The 5V reference 28 consists of resistors R1–R3, capacitor C3, and diode CR1. Diode CR1 is a 2.5V shunt-regulator IC. Resistor R1 provides the bias current for diode CR1. Resistors R2 and R3 scales the 2.5V reference to 5V. Capacitor C3 provides feedback compensation for the shunt regulator IC CR1.

The preferred 5V reference 28 uses the following components:

| | |
|---|---|
| R1 | 4020Ω, .1W |
| R2 | 24.9K, .1W |
| R3 | 24.9K, .1W |
| C3 | .01µF, 50V |

The oscillator 22 consists of timer U1, resistor R4 and capacitor C4. Timer U1 is the industry standard 555-timer. The frequency is determined by resistor R4 and capacitor C4. The square-wave output of timer U1 is integrated by resistor R5 and capacitor C5 to provide a 100KHz-sawtooth for use by the pulse-width-modulator 14.

The preferred oscillator 22 components are the following:

| | |
|---|---|
| R4 | 4990, .1W |
| C4 | 1000pF, 50V |
| R5 | 4990Ω, .1W |
| C5 | 1000pF, 50V |

The pulse-width-modulator 14 ("PWM") consists of a comparator U2a, transistors Q1 and Q2 and resistor R6. The comparator detects the intersection of its two input signals, the 100khz-sawtooth and the output from control circuit 26, and forms a 10V binary logic output signal with a duty cycle D.

The preferred PWM 14 uses the following components:

| | |
|---|---|
| U2a | LM2901 |
| Q1 | 2N5210 |
| Q2 | 2N5087 |
| R6 | 10K, .1W |

The output of PWM 14 is low pass filtered by the combination of resistor R7 and capacitor C6 and compared to a 3.3V and a 6.7V threshold. The threshold voltages are provided by resistors R8–R10. Comparators U2b and U2c with output pull-up resistors R11 and R12, produce two pulse-width-modulated waveforms with appropriate gaps for driving the high-voltage switches Q7 and Q8. Transistors Q3 and Q4, capacitor C7, diode CR2, and resistors R13 and R14 perform the gate-drive and level shifting for driving switch Q7. Transistors Q5 and Q6, capacitor C8, diode CR3, and resistors R15 and R16 perform the gate-drive function for switch Q8.

The preferred component values are shown below:

| | |
|---|---|
| U2b | LM2901 |
| U2c | LM2901 |
| C6 | 100pF, 50V |
| R7 | 2K, .1W |
| R8 | 10K, .1W |
| R9 | 10K, .25W |
| R10 | 10K, .25W |
| R11 | 10K, .1W |
| R12 | 10K, .1W |
| Q3 | 2N5210 |
| Q4 | 2N5087 |
| Q5 | 2N5210 |
| Q6 | 2N5087 |
| C7 | .1µF, 200V |
| C8 | .1µF, 200V |
| CR2 | 1N4745 |
| CR3 | 1N4745 |

-continued

| | |
|---|---|
| R13 | 10K, .1W |
| R14 | 20Ω, .1W |
| R15 | 20Ω, .1W |
| R16 | 10K, .1W |

The pump control 26 senses voltages V9 and V10. Voltage V9 is sensed and scaled down by the resistive divider 32 made up of resistors R17–R19. The scaling is set such that when voltage V9=80V, the divider 32 output=5V. The divider 32 output is compared to the 5V reference 28. The Operational Amplifier U3a and capacitor C12 form an integrator whose output ramps up when voltage V9<80V and ramps down when voltage V9>80V. This is the direction control for the pump 16.

Voltage V10 is sensed and scaled down by the resistive divider 32 made up of resistors R20–R22. The scaling is set such that when voltage V10=190V, the divider 32 output= 5V. The divider 32 output is compared to the 5V reference 28. The Operational Amplifier U3b and capacitor C11 form an integrator whose output ramps up when voltage V10<190V and ramps down when voltage V10>190V.

When voltage V10<190V, diode CR6 is back biased and does not conduct. It has no effect on the pump direction. When voltage V10>190V, diode CR6 is forward bias and bleeds current from the voltage V9 resistive divider 32. This renders the pump-direction integrator in a regulation state, and regulates voltage V10 at 190V, as voltage V9 changes according to load conditions. Diode CR5 keeps the output of the voltage V10 sense OpAmp U3b from saturation toward the 10V supply.

The preferred pump control 26 uses the following components:

| | |
|---|---|
| R17 | 374K, .1W |
| R18 | 374K, .1W |
| R19 | 49.9K, .1W |
| R20 | 1M, .125W |
| R21 | 815K, .1W |
| R22 | 49.9K, .1W |
| C11 | .1µF, 50V |
| C13 | 1000pF, 50V |
| CRC | 1N914 |
| CR5 | 1N914 |

The safety discharge circuit 20 consists of resistors R23–R27, transistor Q9 and diode CR4. Normally, an external short circuit between terminals DISCHARGE1 and DISCHARGE2 keeps transistor Q9 in a non-conducting state. When the energy storage device 6 is physically removed from the remote device 4, the external short circuit no longer be present. Resistor R27 and diode CR4 will provide 16V gate drive for transistor Q9 and put transistor Q9 in the full conduction state. Resistors R23–R26 are power resisters that will be connected across storage capacitor C10, discharging storage capacitor C10 in the process to a safe level of 4V. The discharge time-constant is 0.2 Sec. This should be fast enough to dissipate the stored energy in storage capacitor C10 and to prevent service craftsmen from accidentally contacting potentially hazardous high voltage.

The preferred component values are shown below:

| | |
|---|---|
| R23 | 51Ω, 5W |
| R24 | 51Ω, 5W |
| R25 | 51Ω, 5W |
| R26 | 51Ω, 5W |
| R27 | 2M, .125W |
| Q9 | 1RF840 |
| CR4 | 1N4745 |

Figure 4:
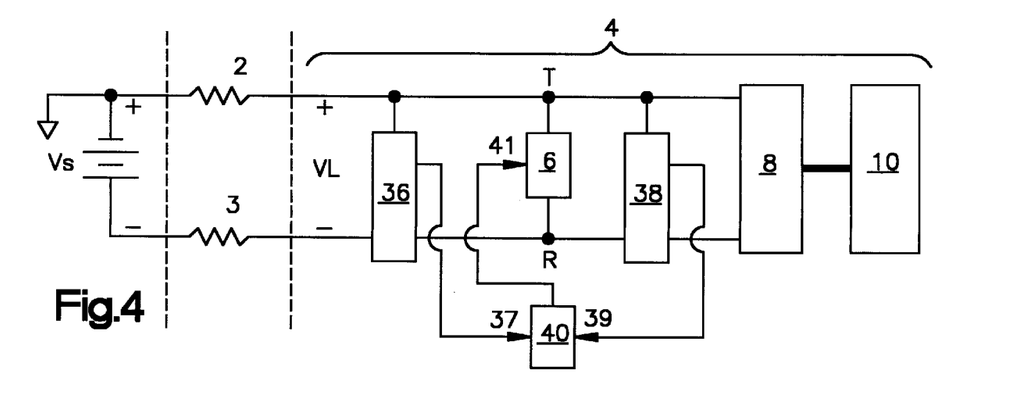
FIG. 4 is a block diagram of an alternate remotely powered system.

Now referring to FIG. 4, another alternative embodiment of the present invention is shown. The remote device 4 in this embodiment utilizes two power detection circuits 36 & 38 which are external to the pumped storage device 6. The input power detection circuit 36 senses a characteristic of the available input power to device 4. The load power detection circuit 38 senses a characteristic of the load power demanded by device 4. Output signals 37 and 39 from the input power detection circuit 36 and the load power detection circuit 38, respectively, are provided to a decision unit 40. The decision unit 40, based on the signals 37 and 39 received from the input power detection circuit 36 and the load power detection circuit 38, provides a signal 41 to pumped energy storage system 6 indicating whether pump 16 should cause the energy storage element C10 to store energy or provide power to the device 4. The decision unit 40 and the power detection circuits 36 and 38 in the preferred embodiment are arranged in the same configuration as pump control 26, but could be arranged in other configurations.

The characteristics sensed by the power detection circuits 36 and 38 in the preferred embodiment are voltage levels but could be the actual available input power and power demand, the input and output currents, the voltage levels, or any other signals related to power. The power detection circuits in the preferred embodiment comprise voltage divider networks but could comprise other circuits capable of measuring the power characteristics.

The decision unit 40 compares the characteristics sensed by power detection circuits 36 and 38 either to each other or to threshold levels to determine whether the energy storage unit C10 should store energy or provide power and outputs a signal 41 to the pumped energy storage device 6 indicating the decision. The decision unit 40 preferably utilizes comparators without hysteresis, but could utilize comparators with hysteresis or other devices without departing from the spirit of the invention. The pump 16, based on the signal 41 from decision unit 40, functions as previously described to cause the energy storage element C10 to store energy or provide power to the device 4.

Having described in detail the preferred and alternate embodiments of the present invention, including preferred modes of operation, it is to be understood that the operation could be carried out with different elements and steps. The preferred and alternate embodiments are presented only by way of example and are not meant to limit the scope of the present invention which is defined by the following claims.

What is claimed:

1. A remotely powered device comprising:
   (a) input terminals for receiving available input power from a remote power source;
   (b) a load element coupled to said input terminals, said load element consuming at least a portion of said available input power received by said input terminals and generating a load power demand;
   (c) an input capacitive device coupled to said input terminals for providing transient bypass for said remote device;
   (d) an energy storage device coupled to said input terminals, said energy storage device being configured to store at least a portion of said input power and to supply stored energy to said input terminals; and
   (e) a pump device coupled to said input terminals and to said energy storage device, said pump device being operative to cause said energy storage device to store at least a portion of said input power when said input power level is above a first threshold level, and to cause said energy storage device to supply energy to said input terminals when said input power level is below a second threshold level.

2. The device according to claim 1 wherein said input power level is greater than said first power threshold level when said available input power is greater than the load power demands, and said input power level is less than said second power threshold level when said available input power is less than the load power demands.

3. The device according to claim 1 wherein said input power level is a voltage level.

4. The device according to claim 1 wherein said input power level is a current level.

5. The device according to claim 1 wherein said pump device causes said energy storage device to store energy at a voltage level higher than the voltage level of the input energy level.

6. The device according to claim 1 wherein said pump device pumps energy from said input terminals into said storage device.

7. The device according to claim 6 further comprising a controller operatively coupled to said pump device, said controller including voltage measuring circuit for measuring the voltage level at said input and said storage element, said controller being responsive to said measured voltage levels and causing said pump device to cease pumping energy into said storage device.

8. The device according to claim 7 wherein said controller comprises:
   (1) a first voltage divider network coupled across said input terminal;
   (2) a second voltage divider coupled across said storage device; and
   (3) a comparator circuit for providing control signals in response to said voltage levels provided by said voltage divider networks.

9. The device according to claim 1 wherein said pump includes a plurality of switches.

10. The device according to claim 9 wherein said switches comprise FET devices.

11. The device according to claim 9 wherein said switches comprise BJT devices.

12. The device according to claim 1 wherein said pump is arranged in a boost power converter configuration when said storage element stores energy and a buck power converter configuration when said storage element supplies energy.

13. The device according to claim 1 further comprising a current limiter coupled between said input terminals and said pump device and a safety discharge circuit coupled to said energy storage device.

14. The device according to claim 13 wherein said current limiter is a bi-directional current limiter.

15. The device according to claim 1 wherein said first threshold level equals said second threshold level.

16. The device according to claim 1 wherein said pump is a bi-directional pump.

17. The device according to claim 1 wherein said pump is a bi-directional power converter.

18. A remotely powered system comprising:
(a) a power source;
(b) transmission wires coupled to said power source for transmitting energy from said power source to a remotely powered device; and
(c) said remotely powered device comprising:
  (1) input terminals for receiving available input power from a remote power source;
  (2) a load element coupled to said input terminals, said load element consuming at least a portion of said available input power received by said input terminals and generating a load power demand;
  (3) an input capacitive device coupled to said input terminals for providing transient bypass for said remote device;
  (4) an energy storage device coupled to said input terminals, said energy storage device being configured to store at least a portion of said input power and to supply stored energy to said input terminals; and
  (5) a pump device coupled to said input terminals and to said energy storage device, said pump device being operative to cause said energy storage device to store at least a portion of said input power when said input power level is above a first threshold level, and to cause said energy storage device to supply energy to said input terminals when said input power level is below a second threshold level.

19. A power supply for a remotely powered device comprising:
(a) input terminals for receiving available input power from a remote power source;
(b) a power converter coupled to said input terminals, said power converter consuming at least a portion of said available input power received by said input terminals and generating a load power demand;
(c) an input capacitive device coupled to said input terminals for providing transient bypass for said remote device;
(d) an energy storage device coupled to said input terminals, said energy storage device being configured to store at least a portion of said available input power and to supply stored energy to said input terminals; and
(e) a pump device coupled to said input terminals and to said energy storage device, said pump device being operative to cause said energy storage device to store at least a portion of said input power when said input power level is above a first threshold level, and to cause said energy storage device to supply energy to said input terminals when said input power level is below a second threshold level.

20. A method of providing power to a device located remotely from a power source comprising the steps of:
(a) providing power to said remote device at an input;
(b) storing at least a portion of said power at a voltage level higher than the voltage level at said input when said voltage level at said input is higher than a first threshold level; and
(c) supplying energy to said input when the voltage level at said input falls below a second threshold level.

21. A method of providing power to a device located remotely from a power source comprising the steps of:
(a) providing power to said remote device at an input;
(b) storing at least a portion of said power at a voltage level higher than the voltage level at said input when said power available at said input is greater than the power demanded by said remote device; and
(c) supplying energy to said input when said power available at said input is less than the power demanded by said remote device.

22. A remotely powered device comprising:
(a) input terminals means for receiving input energy from a remote power source;
(b) load means for consuming input energy received by said input terminals;
(c) energy storage means for storing at least of portion of said input energy and for supplying said stored energy to said input terminals; and
(d) pump means for causing said energy storage means to store at least a portion of the input energy when said input energy level is above a first threshold level and for causing said energy storage device to supply energy to said input terminals when said input energy level is below a second threshold level.

23. A remotely powered device comprising:
(a) input terminals for receiving available input power from a remote power source;
(b) a load element coupled to said input terminals, said load element consuming at least a portion of said available input power received by said input terminals and generating a load power demand;
(c) an input capacitive device coupled to said input terminals for providing transient bypass for said remote device;
(d) an energy storage device coupled to said input terminals, said energy storage device being configured to store at least a portion of said available input power and to supply stored energy to said input terminals; and
(e) a pump device coupled to said input terminals and to said energy storage device, said pump device being operative to cause said energy storage device to store at least a portion of said available input power when said available input power is greater than said load power demands, and to cause said energy storage device to supply energy to said input terminals when said available input power is less than said load power demands.

24. A remotely powered device comprising:
(a) input terminals for receiving available input power from a remote power source;
(b) a load element coupled to said input terminals, said load element consuming at least a portion of said available input power received by said input terminals and generating a load power demand;
(c) an input capacitive device coupled to said input terminals for providing transient bypass for said remote device;
(d) an energy storage device coupled to said input terminals, said energy storage device being configured to store at least a portion of said input power and to supply stored energy to said input terminals;
(e) an input power detector coupled to said input terminals for measuring an input power characteristic;
(f) a load power detector coupled to said load element for measuring a load power demand characteristic
(g) a decision unit coupled to said input power detector and said output power detector, said decision unit providing an output in response to signals from said input power detector and said load power detector, said output signal providing a store indication signal when said energy storage device should store energy and providing a supply indication signal when said energy storage device should supply energy; and (h) a pump device coupled to said input terminals, said energy storage device and said decision unit, said pump device being operative to cause said energy storage device to store at least a portion of said input power in response to said store indication signal and being operative to cause said energy storage device to supply energy to said input terminals in response to said supply indication signal.

25. The device according to claim 24 wherein said input power detector, load power detector, and said decision unit are external to said pump device.

* * * * *